(12) United States Patent
Nam et al.

(10) Patent No.: US 12,219,366 B2
(45) Date of Patent: Feb. 4, 2025

(54) ACTIVE USER EQUIPMENT COUNTING

(71) Applicant: QUALCOMM Incorporated, San Diego, CA (US)

(72) Inventors: Wooseok Nam, San Diego, CA (US); Sony Akkarakaran, Poway, CA (US); Yucheng Dai, San Diego, CA (US); Tao Luo, San Diego, CA (US); Junyi Li, Fairless Hills, PA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/573,699

(22) Filed: Jan. 12, 2022

(65) Prior Publication Data

US 2023/0224721 A1    Jul. 13, 2023

(51) Int. Cl.
- *H04W 4/021* (2018.01)
- *H04W 16/18* (2009.01)
- *H04W 72/044* (2023.01)

(52) U.S. Cl.
CPC ........... *H04W 16/18* (2013.01); *H04W 4/021* (2013.01); *H04W 72/046* (2013.01)

(58) Field of Classification Search
CPC ....... H04W 4/02; H04W 4/021; H04W 4/029; H04W 4/046; H04W 16/18; H04W 16/28
See application file for complete search history.

(56) References Cited

U.S. PATENT DOCUMENTS

| | | | |
|---|---|---|---|
| 10,772,068 B1 * | 9/2020 | Liu | H04L 67/146 |
| 11,510,219 B1 * | 11/2022 | Sevindik | H04W 72/542 |
| 2005/0037767 A1 * | 2/2005 | Kim | H04L 69/04 455/450 |
| 2010/0303023 A1 * | 12/2010 | Nader | H04W 72/30 370/329 |
| 2014/0331272 A1 * | 11/2014 | Gupta | H04W 4/021 726/1 |
| 2016/0119762 A1 * | 4/2016 | Zhu | H04B 7/0452 370/312 |
| 2017/0134959 A1 * | 5/2017 | Miura | H04W 16/32 |
| 2017/0311284 A1 * | 10/2017 | Basu Mallick | H04W 68/02 |
| 2018/0213353 A1 | 7/2018 | Ogawa et al. | |
| 2019/0028913 A1 * | 1/2019 | Park | H04L 25/02 |
| 2019/0306781 A1 * | 10/2019 | Do | H04W 4/021 |

(Continued)

FOREIGN PATENT DOCUMENTS

| | | |
|---|---|---|
| CN | 109698934 A | 4/2019 |
| CN | 110972068 A | 4/2020 |

OTHER PUBLICATIONS

International Search Report and Written Opinion—PCT/US2022/081900—ISA/EPO—Mar. 16, 2023.

*Primary Examiner* — Jean A Gelin

(74) *Attorney, Agent, or Firm* — Sunstein LLP

(57) ABSTRACT

Techniques are provided for determining a number of user equipment in an area. An example method for determining a number of mobile devices in a counting area includes determining the counting area, determining counting configuration information based on the counting area, transmitting the counting configuration information to one or more mobile devices, receiving counting responses from the one or more mobile devices, and determining the number of mobile devices in the counting area based on the counting responses.

30 Claims, 12 Drawing Sheets

(56) References Cited

U.S. PATENT DOCUMENTS

| | | | |
|---|---|---|---|
| 2020/0107180 A1* | 4/2020 | Berggren | H04W 72/542 |
| 2020/0169523 A1* | 5/2020 | Li | H04L 51/214 |
| 2020/0244346 A1* | 7/2020 | Goettle | H04B 7/0408 |
| 2020/0280817 A1* | 9/2020 | Clanton | H04W 4/02 |
| 2020/0383082 A1* | 12/2020 | Liu | H04W 4/029 |
| 2021/0112068 A1* | 4/2021 | Harris | H04L 63/107 |
| 2021/0185637 A1 | 6/2021 | Agarwal | |
| 2021/0397875 A1* | 12/2021 | Riedle | G06V 10/145 |
| 2022/0104102 A1* | 3/2022 | Amar | H04W 4/06 |
| 2022/0116980 A1* | 4/2022 | Pardhasarathy | H04L 5/0064 |
| 2022/0183002 A1* | 6/2022 | Yeo | H04L 1/1607 |
| 2022/0264448 A1 | 8/2022 | Gonuguntla et al. | |
| 2022/0279581 A1* | 9/2022 | Baek | H04W 64/00 |
| 2022/0295236 A1* | 9/2022 | Baek | H04W 76/40 |
| 2022/0303716 A1* | 9/2022 | Afifi | H04L 41/16 |
| 2022/0408410 A1* | 12/2022 | Ratasuk | H04W 72/046 |
| 2023/0162598 A1* | 5/2023 | Naito | G08G 1/017 |
| | | | 340/933 |

\* cited by examiner

ACTIVE USER EQUIPMENT COUNTING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications. For example, in crowd monitoring application, it may also be desirable to know the number of UEs in a certain geographical area to assist in the prediction and monitoring of pedestrian traffic.

SUMMARY

An example method for determining a number of mobile devices in a counting area according to the disclosure includes determining the counting area, determining counting configuration information based on the counting area, transmitting the counting configuration information to one or more mobile devices, receiving counting responses from the one or more mobile devices, and determining the number of mobile devices in the counting area based on the counting responses.

Implementations of such a method may include one or more of the following features. The counting configuration information may include at least one of a geographical coordinate and a terrestrial indication information to define the counting area. The counting configuration information may include at least one base station identification value. The counting configuration information may include at least one beam identification value. The counting configuration information may include a beam direction assumptions associated with the counting area. The counting configuration information may include quasi-colocation assumptions associated with stations neighboring the counting area. The counting configuration information may include one or more reference signal received power values associated with one or more reference signals that are detectable in the counting area. The counting configuration information may include device type information indicating a type of mobile devices to send a counting response. Each of the counting responses may include identification information associated with a mobile device that sent a counting response.

An example method for transmitting a counting response to a base station according to the disclosure includes receiving counting configuration information, performing one or more signal measurements based on the counting configuration information, and transmitting the counting response to the base station based on the one or more signal measurements and the counting configuration information.

Implementations of such a method may include one or more of the following features. Transmitting the counting response may be in response to receiving the counting configuration information. Transmitting the counting response may be based on detecting a triggering condition defined in the counting configuration information. The counting configuration information may include at least one of a geographical coordinate and a terrestrial indication information to define a counting area. The counting configuration information may include a beam direction assumptions associated with a counting area. The counting configuration information may include quasi-colocation assumptions associated with stations neighboring a counting area. The counting configuration information may include one or more reference signal received power values associated with one or more reference signals that are detectable in a counting area. The counting configuration information may include at least one base station identification value. The counting configuration information may include at least one beam identification value. The counting configuration information may include device type information indicating a type of mobile device to send the counting response. The counting response may include identification information associated with a mobile device.

Items and/or techniques described herein may provide one or more of the following capabilities, as well as other capabilities not mentioned. A network server may require a count of user equipment in an area. The server may determine a counting area based on geographic and/or signal based constraints. Counting configuration information may be sent to user equipment to define the counting area. The user equipment may evaluate the counting configuration information and send a counting response if it is in the defined counting area. The configuration information may include trigger conditions and the user equipment may be configured to autonomously monitor for the trigger conditions and send a counting response when a trigger condition is detected. The network server may determine the count of user equipment in the area based on the counting responses. Other capabilities may be provided and not every implementation according to the disclosure must provide any, let alone all, of the capabilities discussed.

DETAILED DESCRIPTION

Figure 1:
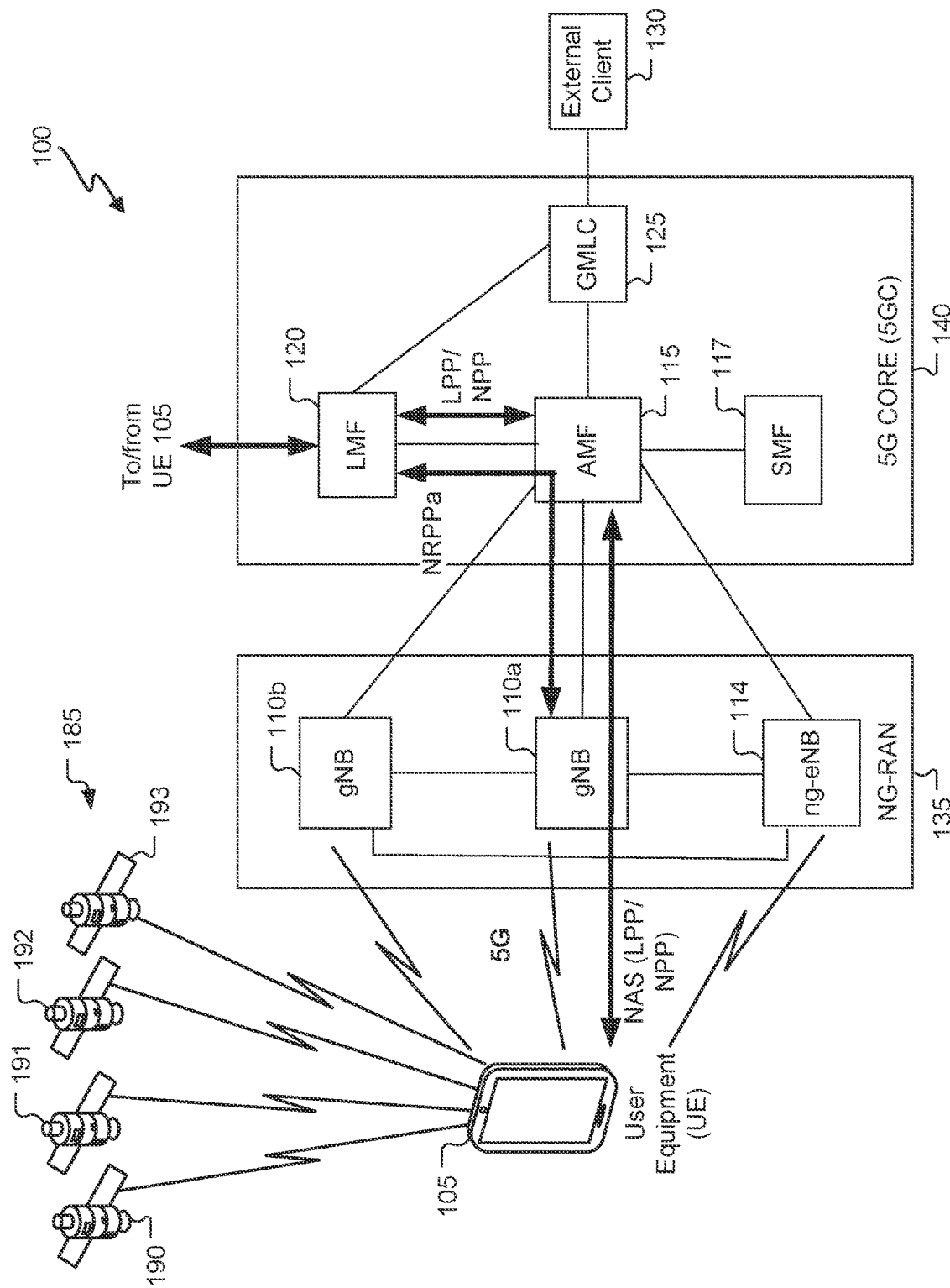
FIG. 1 is a simplified diagram of an example wireless communications system.

Techniques are discussed herein for determining a number of UEs in an area. In many urban planning and emergency response use cases, it is often desirable to know the number of people in a certain geographical area. The count of people may be used, for example, to predict or monitor traffic, assist in building business models for pedestrians (e.g., location based-service/marketing), and generally improve pedestrian traffic flow and prevent congestion. Other UE centric use cases may also need to obtain a count of the UEs in an area. For example, a network server may be configured to detect unattended mobile devices (i.e., security monitoring), or to optimize and balance resources of wireless communications (e.g., handover, cross-RAT off-loading, etc.). A counting area may be established for different use cases. In an example, the counting area may be a relatively small area (e.g., a sub-area within a cell such as a shop, classroom, entrance hall at a railway station or airport, etc.). Counting areas may also be relatively larger areas and may include the coverage area of one or more cells (e.g., stadium, concert hall, shopping mall, an urban district, etc.).

In an example, a counting area may coincide with the coverage area of one or more base stations (BSs), and all UEs in the coverage area may be in the Radio Resource Control (RRC) connected mode. In this example, the connections to the BS may imply that the UE is in the counting area. In other examples, many of the UEs may be in RRC idle or RRC inactive modes camping in the coverage area. Existing tracking areas (TAs) or Radio Access Network (RANs) notification areas may be used to obtain a rough count of the idle or inactive UEs, however, these may be large areas, which may limit the counting accuracy. In operation, counting areas may not coincide with the coverage area of a BS. A counting area may be nested within a BS coverage area, or may straddle different BS coverage areas. Further, a connection to a BS may be based on a link quality metric (e.g., RSRP), while counting operations are typically based on a geographical location. This often leads to inaccurate connection-based counting because the link qualities of adjacent cells may be similar near the edge of the counting area.

The techniques provided herein enable user equipment to autonomously monitor counter conditions and events, and then to provide a counter signal to a base station as an indication to be counted or not. For example, a base station responsible for determining a count of UEs in a counting area (i.e., a counting base station) may provide counting trigger conditions to the UEs to enable the UEs to detect the trigger conditions and provide the appropriate counter responses. In an example, the base stations may be configured to transmit or broadcast a counting trigger signal to UEs in a counting area and the UEs may provide counting responses based on the trigger signal. These techniques and configurations are examples, and other techniques and configurations may be used.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs, such as the gNB 110*a*, the gNB 110*b*, and the ng-eNB 114, may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355 or TS 37.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTf), Reference Signal Time Difference (RSTD), UE Receive-minus-Transmit Time Difference (Rx-Tx Time Difference), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, Rx-Tx Time Difference, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
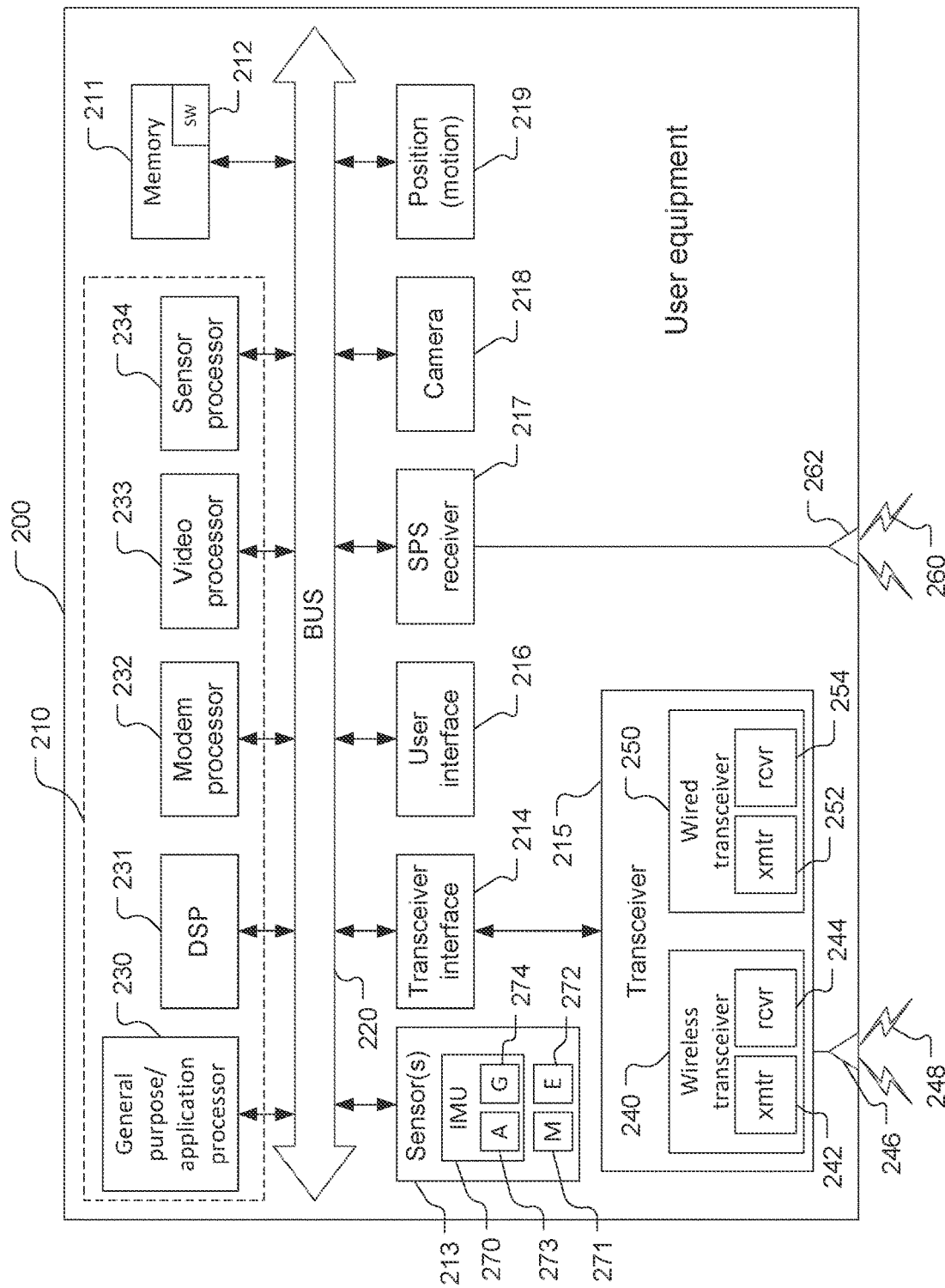
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-processor 230 and the memory 211.

Figure 3:
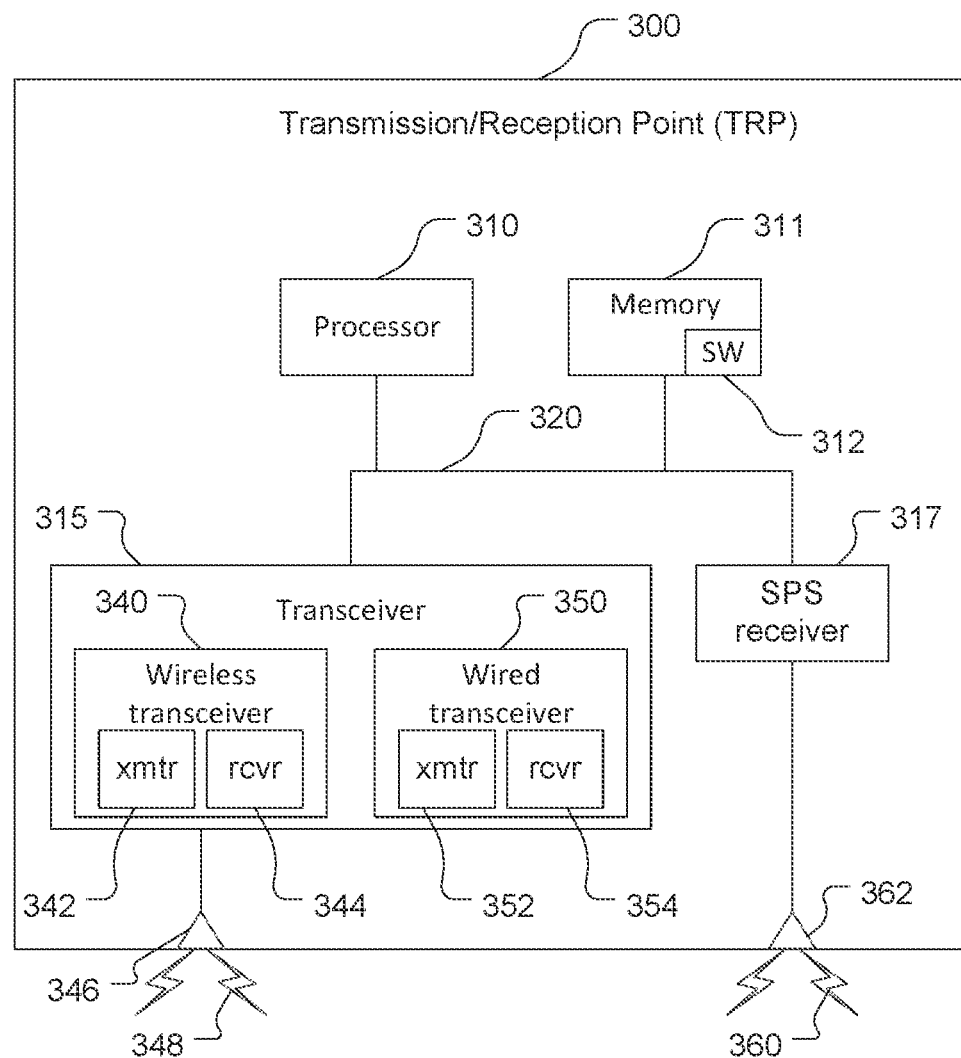
FIG. 3 is a block diagram of components of an example transmission/reception point.
Figure 4:
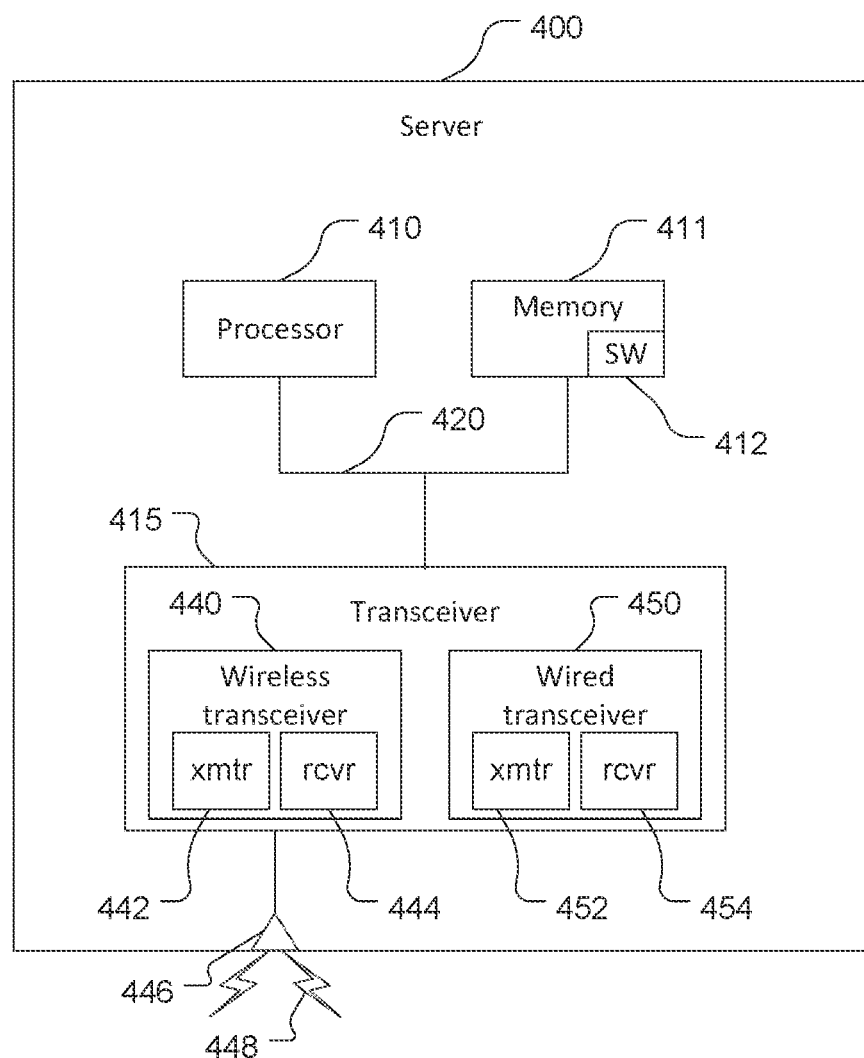
FIG. 4 is a block diagram of components of an example server.

Referring also to FIG. 3, an example of a TRP 300 of the gNB 110a, gNB 110b, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the core network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
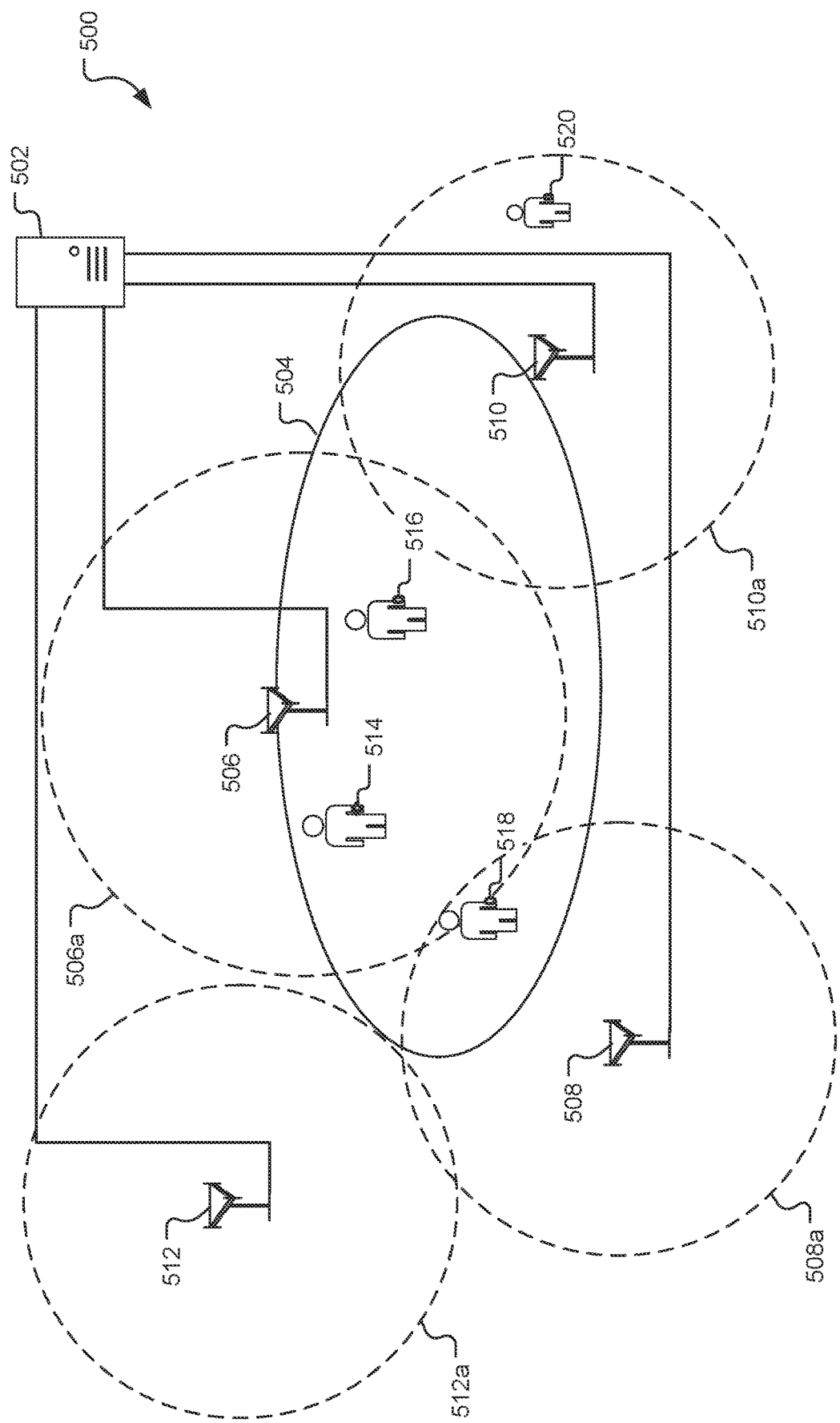
FIG. 5 is a diagram of an example counting area and a plurality of base stations.

Referring to FIG. 5, a diagram 500 of an example counting area 504 and a plurality of base stations is shown. The diagram 500 includes components of the communication network 100 such as a first BS 506, a second BS 508, a third BS 510, and a fourth BS 512. Each of the BSs 506, 508, 510, 512 may include some or all of the components of the TRP 300, and the TRP 300 may be an example of a BS. In an example, the BSs 506, 508, 510, 512 may be gNBs, such as the gNB 110a. A counting server 502 may include some or all of the components of the server 400, and the server 400 may be an example of the counting server 502. In an example, the counting server may be an external client 130 or the LMF 120. Each of the BSs 506, 508, 510, 512 has a respective coverage area including the first coverage area 506a, the second coverage area 508a, the third coverage area 510a, and the fourth coverage area 512a. The BSs 506, 508, 510, 512 may be configured to obtain a count of UEs in a counting area based at least in part on the location of the counting area. For example, the first BS 506, the second BS 508 and the third BS 510 may be configured as counting base stations for the counting area 504 because their respective coverage areas 506a, 508a, 510a overlap with the counting area 504. The fourth BS 512 may be configured as an assisting counting BS because the fourth coverage area 512a does not overlap with the counting area 504.

The diagram 500 depicts three UEs in the counting area, including the first UE 514, a second UE 516, and a third UE 518. A fourth UE 520 is outside of the counting area 504. The UEs 514, 516, 518, 520 may include all or some of the components of the UE 200, and the UE 200 may be an example of the UEs 514, 516, 518, 520. UEs within the coverage area may be in RRC connected or RRC idle/inactive states. In an example, the counting server 502 may request the counting BSs (e.g., the BSs 506, 508, 510) to obtain a count of the UEs in the counting area, and the counting BSs may transmit a counting trigger signal to cause the UEs to provide a counting response. The counting trigger signal may be configured based on the capabilities of the BS and the relative location of the counting area. Counting configuration information may be delivered in system information of a counting BS or assisting BSs. In an example, if only certain Synchronization Signal Block (SSB) (e.g., beam) direction overlaps with the counting area, the SSB/beam-specific Master Information Blocks (MIB) or System Information Blocks (SIB) transmission can be used. In an example, dedicated signaling (e.g., RRC reconfiguration/release messages, counting trigger signal, etc.) may be used for the counting trigger signal. The counting configuration information may include configuration information to define the counting area for the UEs. The configuration information may include geographical coordinates of the counting area (e.g., lat/long/alt, or other grid coordinates), counting trigger signal, beam direction/Quasi Co-Location (QCL) (e.g., SSB ID) assumptions associated with the counting area, and the presence of a counting area or counting BS in neighbor stations. The configuration information may include counting criteria for the UE to evaluate before responding to the counting trigger signal. For example, the criteria may include whether the current position of a UE is in or close enough to the boundary of the counting area, and/or whether the RSRP measurement for a certain beam of the counter BS is over a threshold. The configuration information may also identify device types or classes of UEs to be counted (e.g., product type (smartphone, smart watch, table, etc.), device manufacturer, and/or software version, etc.). Other types or classes may also be used.

The configuration information may indicate a priority for providing a counting response. For example, high security or hazardous areas may have a higher priority, while marketing or recreational areas may have a lower priority. The configuration information may further indicate procedures or parameters for the UE to provide one or more counting response messages. For example, the configuration information may include time and/or frequency occasions that a UE should monitor for the counting trigger signal and for sending the counting response. In an example, the counting trigger signal and the counting responses may be shared with legacy paging and Random Access Channel (RACH) occasions. In an example, in an effort to reduce congestion of counting response signals from many UEs, different time and/or frequency offsets for the counting response resource may be used based on a UE identification (UEID), UE type, and/or UE priority (e.g., pre-configured or indicated by the counting trigger signal).

The counting trigger signal may be provided by a counting BS to one or more UEs with various signaling techniques. For example, the counting trigger signal may utilize the Downlink Control Information (DCI) format, SIB configuration of fields, Radio Network Temporary Identifier (RNTI) based techniques, or other signaling techniques as known in the art. For example, legacy paging messages or short message configurations may be reused and/or repurposed. The counting response signal may be transmitted from the UEs to the BS using various signaling techniques. For example, RACH configurations may be used for RRC idle/inactive UEs, and the Physical Uplink Control Channel (PUCCH), or the Physical Uplink Shared Channel (PUSCH) may be used for RRC connected UEs. Other uplink configurations may also be used. For example, legacy RACH or small data transmission configurations may be reused and/or repurposed. In an example, the counting response signal transmitted by the UE may include a UEID, a current position estimate, and/or one or more RSRP measurements associated with mobility and/or positioning reference signals. The configuration of the counting response signal may vary based on UE states (i.e., RRC connected or RRC idle/inactive).

In an embodiment, the BSs 506, 508, 510, 512 may provide the counting configuration information, and the UEs 514, 516, 518, 520 in the coverage may be configured to autonomously monitor conditions indicated in the counting configuration information and then provide counting response signals when the conditions in the configuration information are met. In an example, the conditions may be trigger events such as when a UE enters and/or leaves the counting area 504. A UE may be configured to determine when it enters or leaves the counting area 504 based on the position estimate (e.g., SPS, or terrestrial techniques), when RSRP measurement(s) for certain beam(s) of counter BS(s) is/are above or below a threshold, or when a UE hands over to or from a counter BS. Other techniques may also be used to determine when a UE enters or leaves a counting area. The counting response signal may be sent when the triggering condition is met. For example, the UE may be configured to transmit the counting response signal using a RACH configuration (e.g., for RRC idle/inactive), PUCCH/CG-PUSCH configuration (e.g., for RRC connected), or other signaling techniques as known in the art. For example, legacy RACH or small data transmission configurations may be reused or repurposed. Different signals and message contents may be used based on the triggering conditions. In an example, at least one message may be sent based on an indication that the UE is entering a counting area, and another message may be sent based on an indication that the UE is leaving the counting area. The counting BS and/or counting server 502 may increase or decrease the UE count based on the messages.

Figure 6B:
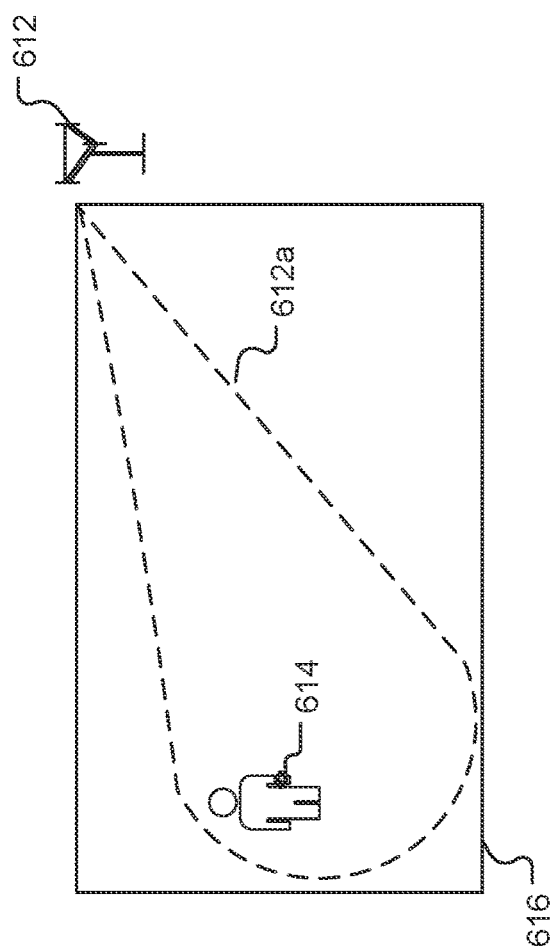
FIGS. 6A-6D are example counting area trigger conditions.
Figure 6A:
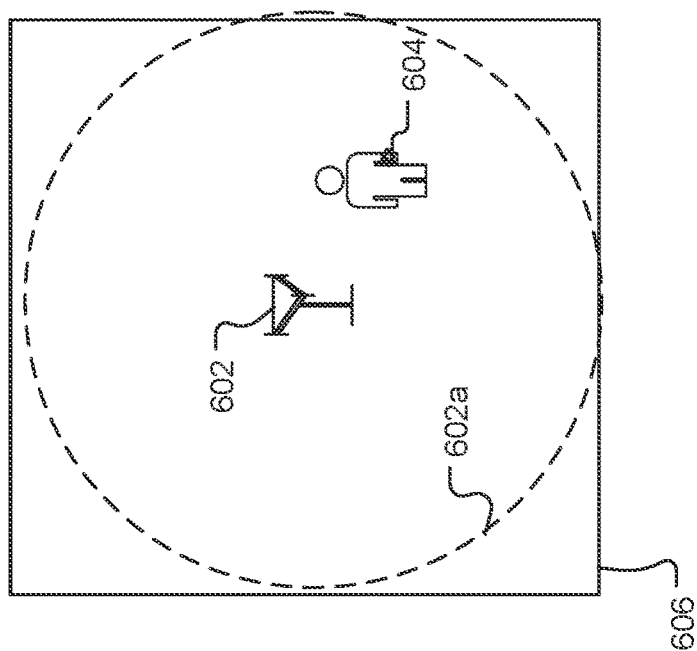
Figure 6C:
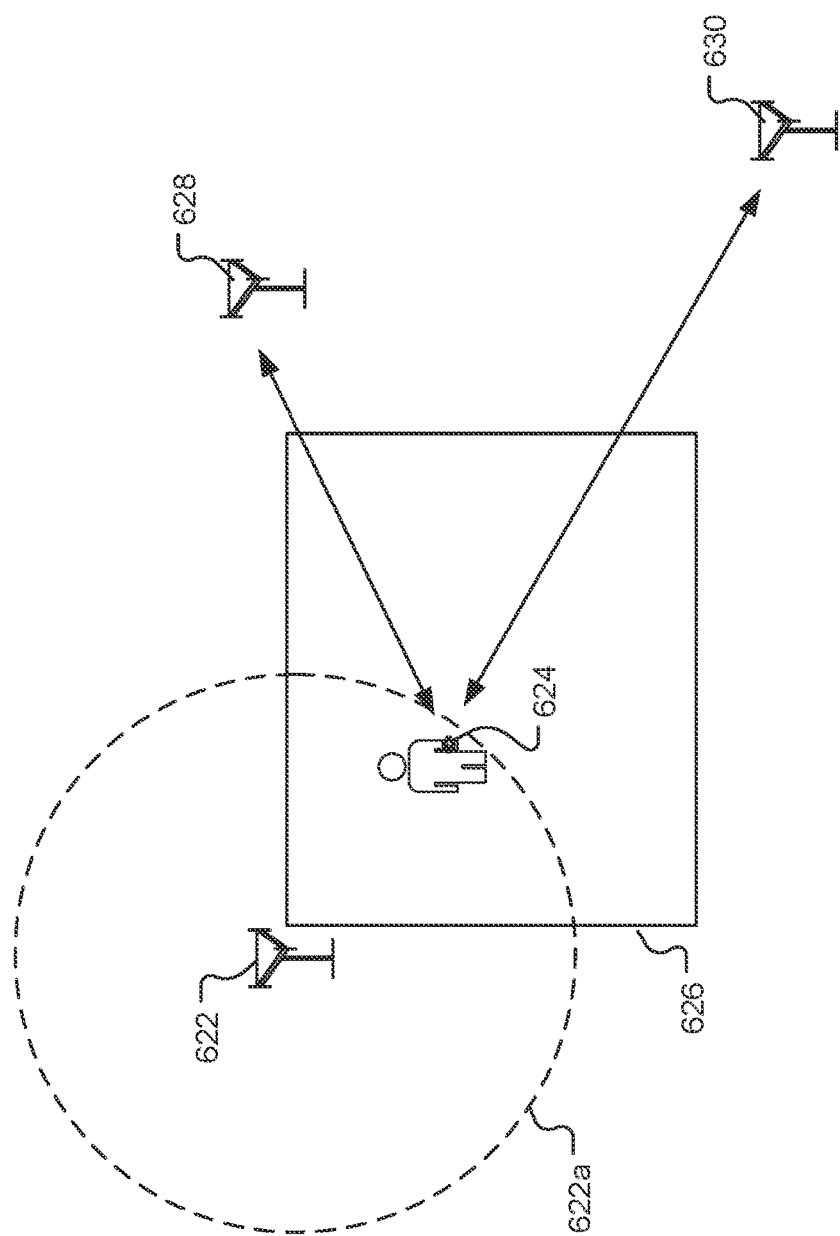

Referring to FIGS. 6A-6D, example counting area trigger conditions are shown. FIG. 6A includes a first example trigger condition with a counting BS 602 and a UE 604. A coverage area 602a of the counting BS 602 is within a counting area 606. The UE 604 may be configured to send a counting response message upon entering the coverage area 602a and/or exiting the coverage area 602a. FIG. 6B includes a second example trigger condition based on the coverage area of a beam 612a transmitted from a counting BS 612. The coverage area of the beam 612a is within a counting area 616, and a UE 614 may be configured to utilize the detection or loss of signal of the beam 612a as trigger conditions to send a counting message. For example, the configuration information provided by a counting BS may include an SSB ID for the beam 612*a* and the UE 614 may send a counting response message when the SSB ID is detected. FIG. 6C includes a third example trigger condition when a counting area 626 has a limited overlap with one or more counting BSs. For example a first BS 622 may be a serving cell for a UE 624, and a first coverage area 622*a* may overlap with a portion of the counting area. Since the coverage area 622*a* extends outside of the counting area 626, trigger conditions for UEs within the coverage area 622*a* (e.g., being served by the first base station 622) may include additional elements. For example, the trigger conditions may require a detected set of additional base stations. For example, the trigger condition for UEs being served by the first BS 622 may also include detecting a second BS 628 and a third BS 630. Detecting the set of additional base stations constrains the portion the first coverage area 622*a* to the overlap with the counting area 626. While the UE 624 is being served by the first BS 622, detection of the second BS 628 and the third BS 630 may complete the trigger condition and the UE may send a counting report message to the first BS 622. In an example, the trigger conditions may also include signal parameters associated with the other BS. For example, RSRP values for signals transmitted by the second BS 628 and the third BS 630 may be used to further define the overlap with the counting area 626. Other combinations of BS signals and signal measurements may be used as trigger conditions.

Figure 6D:
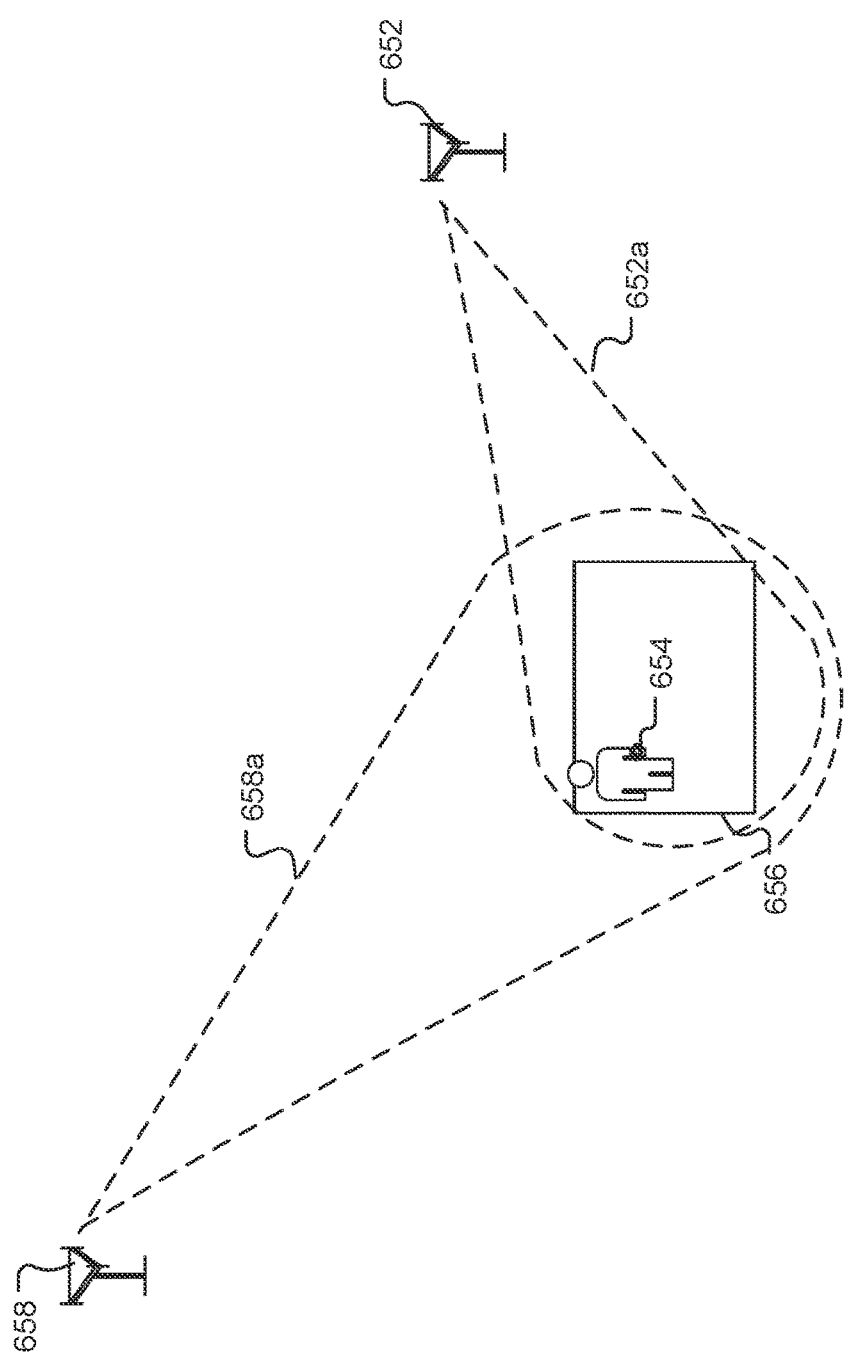

FIG. 6D is a fourth example of a trigger condition. The trigger condition may be based on an intersection of coverage areas associated with one or more beams transmitted from different base stations. For example, a counting area 656 may be located at the intersection of the coverage areas of a first beam 652*a* transmitted from a first BS 652, and the coverage area of a second beam 658*a* transmitted from a second BS 658. For example, a UE 654 may be served by the first beam 652*a* and may be configured to utilize the detection of the second beam 658*a* as a counting trigger condition. Additional beams and other signal parameters may also be used as trigger conditions. For example, a third and fourth beam may also be included in a trigger condition to further define a counting area. Signal measurements (e.g., RSRP) and/or RTT measurements (e.g., ranges) from stations may also be used as trigger conditions by a UE to provide counting response messages.

Figure 7:
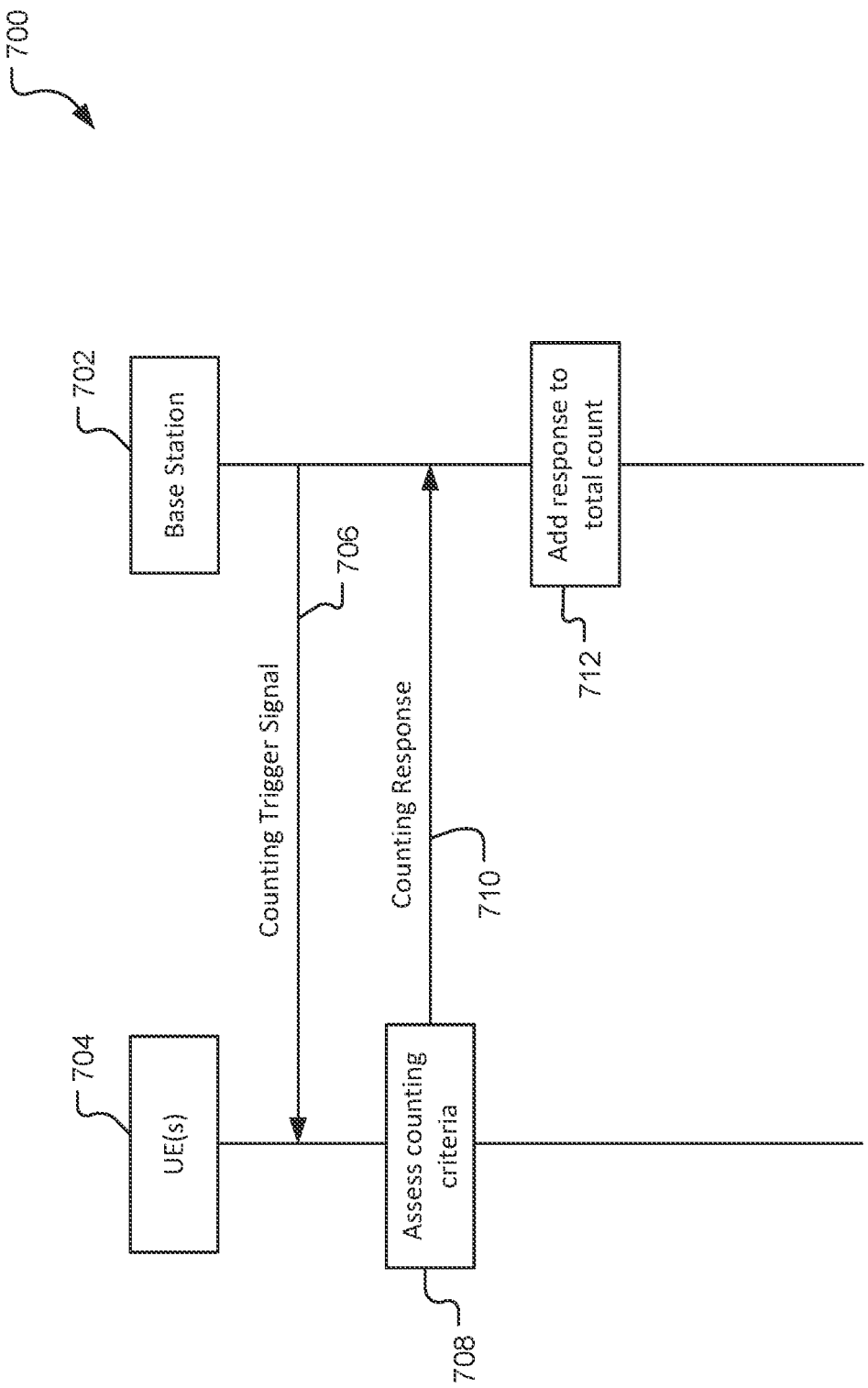
FIG. 7 is an example message flow for network triggered user equipment counting.

Referring to FIG. 7, and example message flow 700 for network triggered UE counting is shown. The message flow 700 is an example, and not a limitation, as other messages may be used to provide counting configuration information and trigger signals to user equipment. A counting BS 702 may be requested to obtain a count of UEs in a specific counting area. The counting area may be based on geographic coordinates (e.g., lat/long/alt), or other terrestrial indications such as city blocks, shopping area, theme parks, or any other parameters which describe a geographical boundary. The counting BS 702, or another network resource such as a counting server 502 or the LMF 120, may be configured to determine trigger conditions associated with the counting area and provide one or more counting trigger signals 706 including trigger configuration information. The configuration information may include geographical information (e.g., lat/long/alt, or other grid coordinates) and/or terrestrial indications. In an example, referring to FIGS. 6A-6D, the configuration information may include beam direction/QCL (e.g., SSB ID) assumptions associated with the counting area, and/or the presence of a counting area or counting BS and neighboring stations. The configuration information may include counting criteria such as whether the current position of a UE is in, or close enough to, the boundary of the counting area, and/or whether the RSRP measurement for a certain beam of the counter BS is over a threshold. Other configuration information may indicate device types or classes of UEs to be counted. In an example, the trigger configuration information may be included with the counting trigger signal 706. The trigger configuration information may also be previously provided in MIB/SIB or other dedicated signaling, and the counting trigger signal 706 may be used to request a counting response from UEs which meet the trigger conditions.

The UEs in the coverage areas of the counting BSs may receive the counting trigger signal 706. For example, a UE 704 may receive the counting trigger signal 706 (and the associated configuration information) and assess the counting criteria at stage 708. For example, the UE 704 may compare its current location (e.g., based on GPS) to the counting area coordinates in the configuration information. In an example, the UE 704 may detect SSB IDs and perform RSRP measurements based on the configuration information to determine whether to send a counting response. If the UE 704 determines it is in the counting area (i.e., based on the configuration information), then the UE 704 sends one or more counting responses 710. The counting response 710 may utilize legacy paging and RACH occasions, and may utilize time and/or frequency offsets based on the configuration information. The counting response 710 may also include a UEID for the UE 704, as well as UE type information, and/or UE priority information (e.g., pre-configured or indicated by the counting trigger signal 706).

At stage 712, the counting BS 702 may utilize the counting response 710 from the UE 704, as well as other UEs, to determine a total count for the counting area. The total count may be provided to a counting server 502 and added with total count information receive from other counting base stations.

Figure 8:
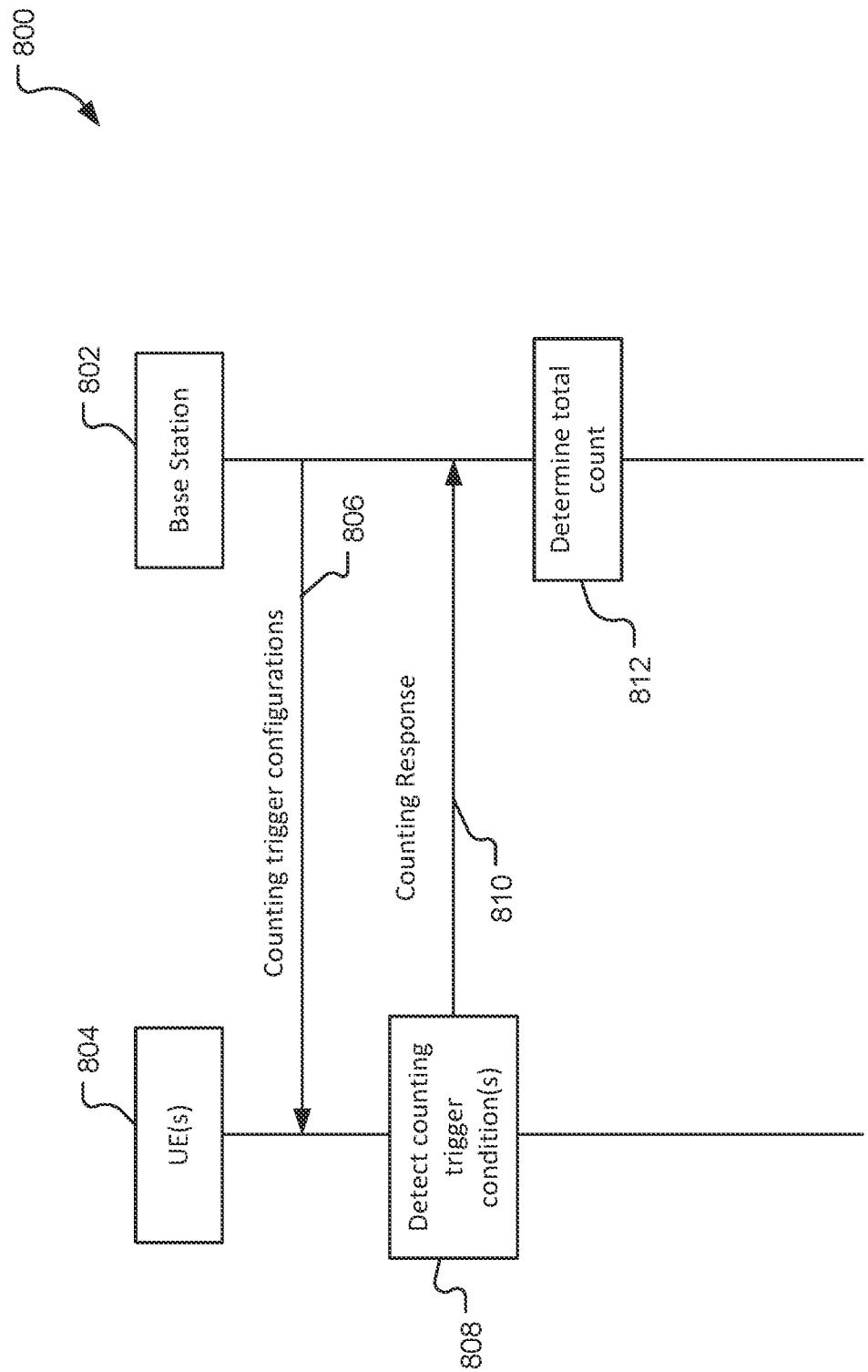
FIG. 8 is an example message flow for event trigger user equipment counting.

Referring to FIG. 8, and example message flow 800 for event triggered UE counting is shown. The message flow 800 is an example, and not a limitation, as other messages may be used to provide counting configuration information and trigger signals to user equipment. A counting BS 802 may be requested to obtain a count UEs in a specific counting area. The counting area may be based on geographic coordinates (e.g., lat/long/alt), or other terrestrial indications such as city blocks, shopping areas, theme parks, or any other parameters which describe a geographical boundary. The counting BS 802, or another network resource such as a counting server 502 or the LMF 120, may be configured to determine trigger conditions associated with the counting area and provide one or more counting trigger configuration messages 806. The counting trigger configuration messages 806 may include geographical information (e.g., lat/long/alt, or other grid coordinates), and/or one or more terrestrial indications. In an example, referring to FIGS. 6A-6D, the counting trigger configuration messages 806 may include beam direction/QCL (e.g., SSB ID) assumptions associated with the counting area, and/or the presence of a counting area or counting BS in neighbor stations. The counting trigger configuration messages 806 may include counting criteria such as whether the current position of a UE is in, or close enough to, the boundary of the counting area, and/or whether the RSRP measurement for a certain beam of the counter BS is over a threshold. Other trigger configuration information may indicate device types or classes of UEs to be counted.

The UEs in the coverage area of the counting BS 802, such as a UE 804, may receive the counting trigger configuration messages 806 and autonomously detect one or more of the trigger conditions at stage 808. For example, the UE 804 may be configure to periodically compare its current location (e.g., based on GPS) to the counting area coordinates in the counting trigger configuration messages 806. In an example, the UE 804 may detect SSB IDs and perform RSRP measurements based on the trigger configurations to determine whether to send a counting response. If the UE 804 detects a trigger condition, then the UE 804 sends one or more counting responses 810. The UE 804 may transmit the counting response 810 using a RACH configuration (e.g., for RRC idle/inactive), PUCCH/CG-PUSCH configuration (e.g., for RRC connected), or other signaling techniques as known in the art. The counting response 810 may utilize legacy paging and RACH occasions, and may utilize time and/or frequency offsets based on the configuration information. The counting response 810 may also include a UEID for the UE 804, as well as UE type information, and/or UE priority information (e.g., pre-configured or indicated by the counting trigger configuration messages 806).

At stage 812, the counting BS 802 may utilize the counting response 810 from the UE 804, as well as other UEs, to determine a total count for the counting area. The total count may be provided to a counting server 502 and added with total count information receive from other counting base stations.

Figure 9:
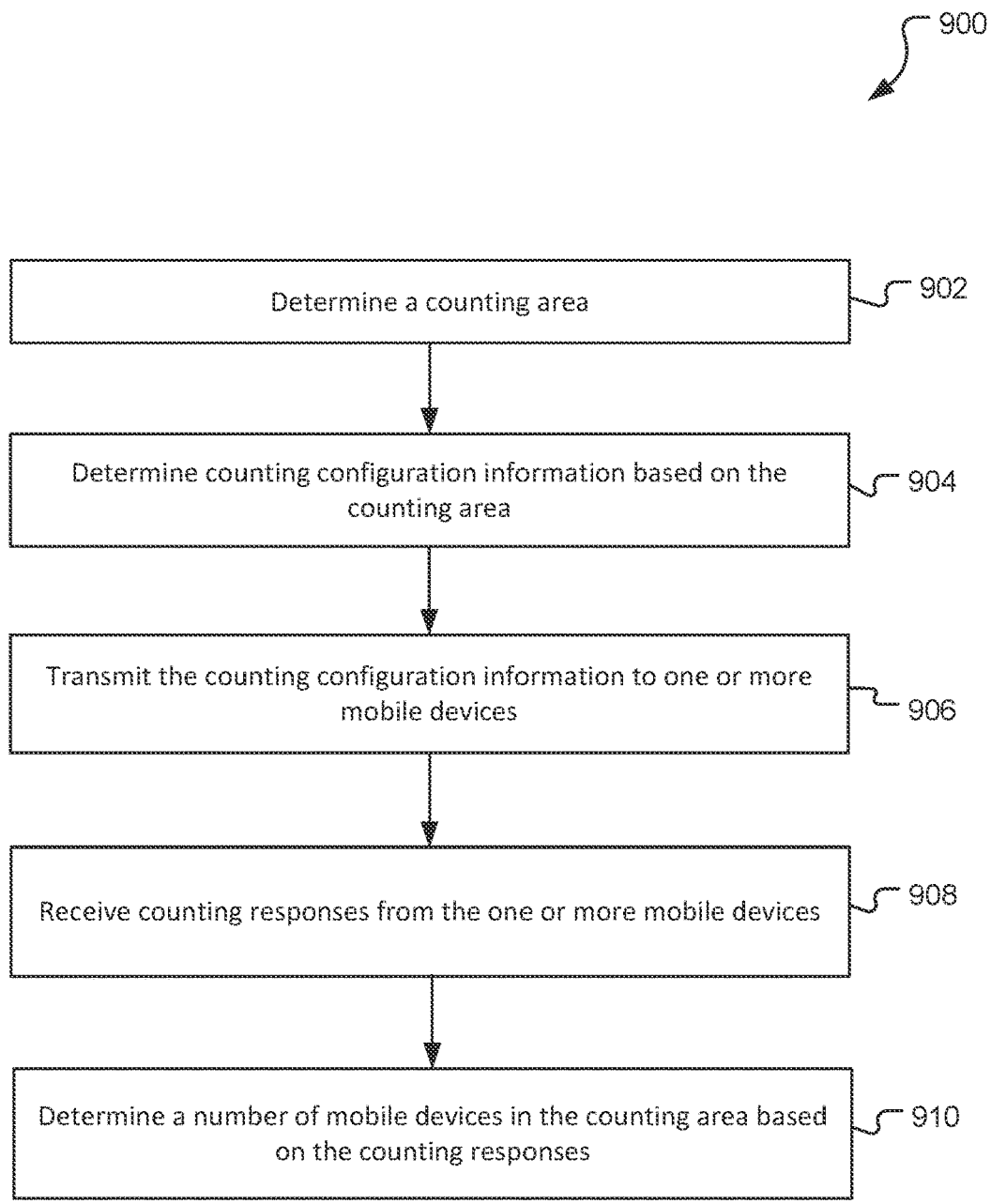
FIG. 9 is a process flow for an example method for determining a number of mobile devices in a counting area.

Referring to FIG. 9, with further reference to FIGS. 1-8, a method 900 for determining a number of mobile devices in a counting area includes the stages shown. The method 900 is, however, an example and not limiting. The method 900 may be altered, e.g., by having stages added, removed, rearranged, combined, performed concurrently, and/or having single stages split into multiple stages.

At stage 902, the method includes determining a counting area. A server 400, such as the counting server 502, including a processor 410 and a transceiver 415, is a means for determining a counting area. In an example, the server 400 may include an Application Programming Interface (API) in the memory 411 configured to receive counting area information from outside resources. For example, the counting server 502 may be configured to communicate with the Internet and users, or other location services, may provide a counting area via the API. The counting area may be determined in other ways for other use cases. For example, emergency management systems may request a count of UEs for an area from the communication network 100. Internal network processes for optimizing and balancing resources may define a counting area, and the counting server 502 may be configured to obtain a count based on the defined counting area. The counting area may be based on geographic coordinates or other terrestrial indication information such as addresses, neighborhoods, street names, buildings, locations, map grid squares, etc. which define geographic areas where UEs may be located.

At stage 904, the method includes determining counting configuration information based on the counting area. The server 400, including the processor 410 and the transceiver 415, is a means for determining the counting configuration information. In an example, the counting configuration information may be geographic coordinates (e.g., lat/lon/alt, or other coordinates) and/or other terrestrial indications. In an example, referring to FIGS. 6A-6D, the counting area may be based on cell and/or beam coverage areas associated with one or more base stations, and the configuration information may include information defining the cell and/or beam coverage areas. In an example, if only a certain SSB direction overlaps with the counting area, the SSB/beam-specific MIB or SIB transmission can be used to provide the counting configuration information. In an example, dedicated signaling (e.g., RRC reconfiguration/release messages, counting trigger signals, etc.) may be used for the counting configuration information. For example, the counting configuration information may include beam direction/QCL (e.g., SSB ID) assumptions associated with counting area, and/or the counting BSs and neighboring stations. The counting configuration information may include RSRP measurement information for certain signals (e.g. beams). Examples of the configuration information may include information to enable a UE to identify a serving cell (e.g., FIG. 6A), a beam within the serving cell (e.g., FIG. 6B), and cell and/or beam identification information and RSRP values associated with neighboring cells or detected sets of cells (e.g., FIGS. 6C, 6D). In an embodiment, the counting configuration information may also include information to identify device types or classes of UEs to be counted.

At stage 906, the method includes transmitting the counting configuration information to one or more mobile devices. The server 400, including the processor 410 and the transceiver 415, is a means for transmitting the counting configuration information. In a network triggering embodiment, referring to FIG. 7, the server 400 may be configured to provide the counting configuration information determined at stage 904 to one or more mobile devices, such as the UE 704, in one or more counting trigger signals 706. In an event triggering embodiment, referring to FIG. 8, the server 400 may be configured to provide the counting configuration information determined at stage 904 to one or more mobile devices, such as the UE 804, in one or more counting trigger configuration messages 806. The configuration information may be provided to one or more serving BSs, and then to the one or more mobile devices with various signaling techniques. For example, the counting configuration information may be transmitted in messages based on DCI formats, SIB configuration fields, RNTI based techniques, or other signaling techniques as known in the art. For example, legacy paging message or short message configurations may be reused and/or repurposed.

At stage 908, the method includes receiving counting responses from the one or more mobile devices. The server 400, including the processor 410 and the transceiver 415, is a means for receiving the counting responses. The counting response signal may be transmitted from the mobile devices to BSs using various signaling techniques. For example, RACH configurations may be used for RRC idle/inactive UEs, and the PUCCH, or the PUSCH may be used for RRC connected mobile devices. Other uplink configurations may also be used. For example, legacy RACH or small data transmission configurations may be reused and/or repurposed. In an example, the counting response signals transmitted by the mobile devices may include identification information (e.g., a UEID), current position estimates, and/or one or more RSRP measurements associated with mobility and/or positioning reference signals. The configurations of the counting responses may vary based on the states of the mobile devices (i.e., RRC connected or RRC idle/inactive).

At stage 910, the method includes determining a number of mobile devices in the counting area based on the counting responses. The server 400, including the processor 410 and the transceiver 415, is a means for determining the number of mobile devices. The counting server 502 may receive the counting responses from the counting BSs and may determine the total count in the counting area. Since each mobile device should transmit a counting response to a serving BS, the count of the number of responses (e.g., one per mobile device) may be used to determine the count of mobile devices in the counting area. In an example, the counting server 502 may be configured to remove duplicate counting reports based on the identification information (e.g., UEID) included in the counting response. The counting server 502 may be configured to provide the count information to the requesting user (e.g. via an API) or other networked entity via messaging protocols as known in the art (e.g., LPP/NPP, etc.).

Figure 10:
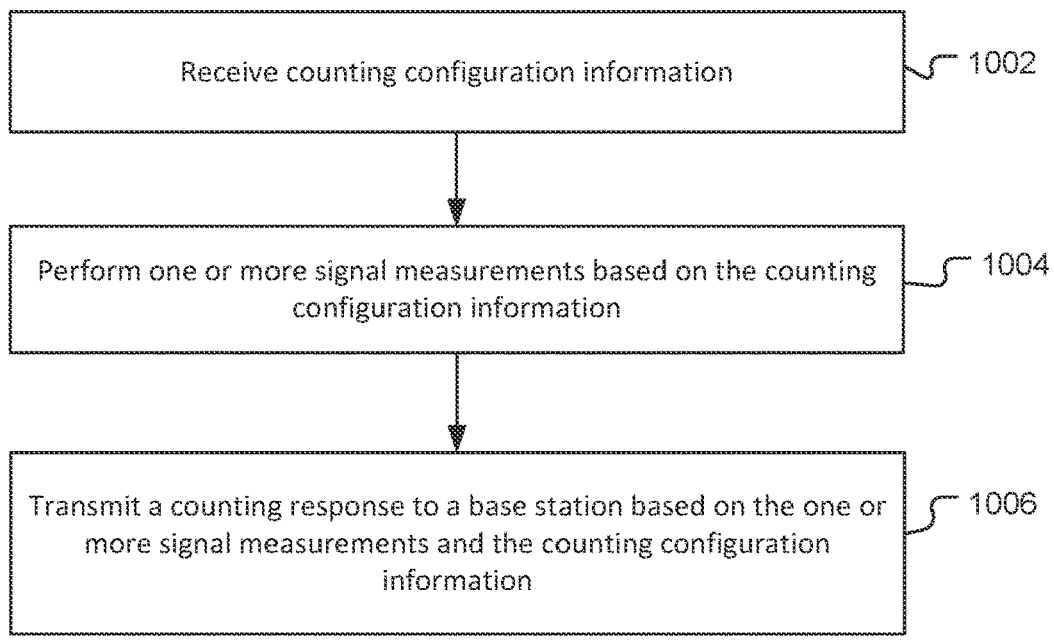
FIG. 10 is a process flow for an example method for transmitting a counting response to a base station.

Referring to FIG. 10, with further reference to FIGS. 1-8, a method 1000 for transmitting a counting response to a base station includes the stages shown. The method 1000 is, however, an example and not limiting. The method 1000 may be altered, e.g., by having stages added, removed, rearranged, combined, performed concurrently, and/or having single stages split into multiple stages.

At stage 1002, the method includes receiving counting configuration information. A UE 200, including a general-purpose processor 230 and a transceiver 215, is a means for receiving the counting configuration information. In a network triggering embodiment, referring to FIG. 7, a serving BS may be configured to provide the counting configuration information in one or more counting trigger signals 706. In an event triggering embodiment, referring to FIG. 8, the serving BS may be configured to provide the counting configuration information in one or more counting trigger configuration messages 806. The counting configuration information may be provided with various signaling techniques. For example, the counting configuration information may be received via DCI signaling, SIB configuration fields, RNTI based techniques, or other signaling techniques as known in the art. Legacy paging message or short message configurations may be reused and/or repurposed. In an example, the counting configuration information may be geographic coordinates (e.g., lat/lon/alt, or other coordinates) and/or other terrestrial indications. The counting area may be based on cell and/or beam coverage areas associated with one or more base stations, and the counting configuration information may include information defining the cell and/or beam coverage areas. In an example, counting configuration information may be included in SSB/beam-specific MIB or SIB transmissions if certain SSBs (e.g., beams) overlap with the counting area. In an example, dedicated signaling (e.g., RRC reconfiguration/release messages, counting trigger signals, etc.) may be used for the counting configuration information. For example, the counting configuration information may include beam direction/QCL (e.g., SSB ID) assumptions associated with counting BSs and neighboring stations. The counting configuration information may include RSRP measurement information for certain signals (e.g. beams). The counting configuration information may include information to enable a UE to identify a serving cell (e.g., FIG. 6A), a beam within the serving cell (e.g., FIG. 6B), and cell and/or beam identification information and RSRP values associated with neighboring cells or detected sets of cells (e.g., FIGS. 6C, 6D). In an embodiment, the counting configuration information may also include information to identify device types or classes of UEs to be counted.

At stage 1004, the method includes performing one or more signal measurements based on the counting configuration information. The UE 200, including the processors 210, the transceiver 215, and/or the SPS receiver 217, is a means for performing the one or more signal measurements. In an example, the UE 200 may be configured to obtain one or more SPS signal measurements with the SPS receiver 217 and determine a current location based on the SPS measurements. A location estimate may also be obtained based on terrestrial positioning techniques such as RSTD, RTT, TDOA, E-CID, etc. as known in the art. In an example, the one or more measurements may include RSRP measurements on signals transmitted from sets of cells and/or beams, such as described in FIGS. 6A-6D. The UE 200 may be configured to detect BS identification and/or beam identification information for neighboring BSs and measure beam parameters such as RSRP and RSRQ. In an example, the UE 200 may be configured to determine round trip time (RTT) information with a BS to determine a range to the BS. In a network triggering embodiment, referring to FIG. 7, the UE 200 may be configured to perform the one or more signal measurements in response to receiving a counting trigger signal 706. In an event triggering embodiment, referring to FIG. 8, the UE 200 may be configured to autonomously perform the one or more signal measurements on a periodic basis (e.g., 1, 5, 10, 100, 1000, etc. msecs) to determine if the counting conditions are met. The UE 200 may obtain the one or more measurements based on other trigger conditions, such as when a mobility handover procedure occurs.

At stage 1006, the method includes transmitting a counting response to the base station based on the one or more signal measurements and the counting configuration information. The UE 200, including the general-purpose processor 230 and the transceiver 215, is a means for transmitting the counting response. In a network triggered embodiment, the UE 200 may be configured to send a counting response 710 in response to receiving the counting trigger signal 706 and determining that the conditions included in the counting configuration information are met. In an event triggered embodiment, the UE 200 may be configured to transmit the counting response 810 when one or more of the triggering conditions in the configuration information are met. The UE 200 may be configured to transmit the counting response signal using a RACH configuration (e.g., for RRC idle/inactive), PUCCH/CG-PUSCH configuration (e.g., for RRC connected), or other signaling techniques as known in the art. Legacy RACH or small data transmission configuration may be reused or repurposed. Different signals and message contents may be used based on the triggering conditions. In an example, at least one counting response may be sent based on an indication that the UE 200 is entering a counting area, and another counting response may be sent based on an indication that the UE 200 is leaving the counting area.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for determining a number of mobile devices in a counting area, comprising: determining the counting area; determining counting configuration information based on the counting area; transmitting the counting configuration information to one or more mobile devices; receiving counting responses from the one or more mobile devices; and determining the number of mobile devices in the counting area based on the counting responses.

Clause 2. The method of clause 1 wherein the counting configuration information includes geographical coordinates to define the counting area.

Clause 3. The method of clause 1 wherein the counting configuration information includes terrestrial indication information to define the counting area.

Clause 4. The method of clause 1 wherein the counting configuration information includes at least one base station identification value.

Clause 5. The method of clause 1 wherein the counting configuration information includes at least one beam identification value.

Clause 6. The method of clause 1 wherein the counting configuration information includes a beam direction assumptions associated with the counting area.

Clause 7. The method of clause 1 wherein the counting configuration information includes quasi-colocation assumptions associated with stations neighboring the counting area.

Clause 8. The method of clause 1 wherein the counting configuration information includes one or more reference signal received power values associated with one or more reference signals that are detectable in the counting area.

Clause 9. The method of clause 1 wherein the counting configuration information includes device type information indicating a type of mobile devices to send a counting response.

Clause 10. The method of clause 1 wherein each of the counting responses includes identification information associated with a mobile device that sent a counting response.

Clause 11. A method for transmitting a counting response to a base station, comprising: receiving counting configuration information; performing one or more signal measurements based on the counting configuration information; and transmitting the counting response to the base station based on the one or more signal measurements and the counting configuration information.

Clause 12. The method of clause 11 wherein transmitting the counting response is in response to receiving the counting configuration information.

Clause 13. The method of clause 11 wherein transmitting the counting response is based on detecting a triggering condition defined in the counting configuration information.

Clause 14. The method of clause 11 wherein the counting configuration information includes geographical coordinates to define a counting area.

Clause 15. The method of clause 11 wherein the counting configuration information includes terrestrial indication information to define a counting area.

Clause 16. The method of clause 11 wherein the counting configuration information includes a beam direction assumptions associated with a counting area.

Clause 17. The method of clause 11 wherein the counting configuration information includes quasi-colocation assumptions associated with stations neighboring a counting area.

Clause 18. The method of clause 11 wherein the counting configuration information includes one or more reference signal received power values associated with one or more reference signals that are detectable in a counting area.

Clause 19. The method of clause 11 wherein the counting configuration information includes at least one base station identification value.

Clause 20. The method of clause 11 wherein the counting configuration information includes at least one beam identification value.

Clause 21. The method of clause 11 wherein the counting configuration information includes device type information indicating a type of mobile device to send the counting response.

Clause 22. The method of clause 11 wherein the counting response includes identification information associated with a mobile device.

Clause 23. An apparatus, comprising: a memory; at least one transceiver; at least on processor communicatively coupled to the memory and the at least one transceiver, and configured to: determine a counting area; determine counting configuration information based on the counting area; transmit the counting configuration information to one or more mobile devices; receive counting responses from the one or more mobile devices; and determine a number of mobile devices in the counting area based on the counting responses.

Clause 24. The apparatus of clause 23 wherein the counting configuration information includes geographical coordinates to define the counting area.

Clause 25. The apparatus of clause 23 wherein the counting configuration information includes terrestrial indication information to define the counting area.

Clause 26. The apparatus of clause 23 wherein the counting configuration information includes at least one base station identification value.

Clause 27. The apparatus of clause 23 wherein the counting configuration information includes at least one beam identification value.

Clause 28. The apparatus of clause 23 wherein the counting configuration information includes a beam direction assumptions associated with the counting area.

Clause 29. The apparatus of clause 23 wherein the counting configuration information includes quasi-colocation assumptions associated with stations neighboring the counting area.

Clause 30. The apparatus of clause 23 wherein the counting configuration information includes one or more reference signal received power values associated with one or more reference signals that are detectable in the counting area.

Clause 31. The apparatus of clause 23 wherein the counting configuration information includes device type information indicating a type of mobile devices to send a counting response.

Clause 32. The apparatus of clause 23 wherein each of the counting responses includes identification information associated with a mobile device that sent a counting response.

Clause 33. An apparatus, comprising: a memory; at least one transceiver; at least one processor communicatively coupled to the memory and the at least one transceiver, and configured to: receive counting configuration information; perform one or more signal measurements based on the counting configuration information; and transmit a counting response to a base station based on the one or more signal measurements and the counting configuration information.

Clause 34. The apparatus of clause 33 wherein the at least one processor is further configured to transmit the counting response is in response to receiving the counting configuration information.

Clause 35. The apparatus of clause 33 wherein the at least one processor is further configured to detect triggering condition defined in the counting configuration information and transmit the counting response based on the triggering condition.

Clause 36. The apparatus of clause 33 wherein the counting configuration information includes geographical coordinates to define a counting area.

Clause 37. The apparatus of clause 33 wherein the counting configuration information includes terrestrial indication information to define a counting area.

Clause 38. The apparatus of clause 37 wherein the counting configuration information includes a beam direction assumptions associated with the counting area.

Clause 39. The apparatus of clause 37 wherein the counting configuration information includes quasi-colocation assumptions associated with stations neighboring the counting area.

Clause 40. The apparatus of clause 37 wherein the counting configuration information includes one or more reference signal received power values associated with one or more reference signals that are detectable in the counting area.

Clause 41. The apparatus of clause 33 wherein the counting configuration information includes at least one base station identification value.

Clause 42. The apparatus of clause 33 wherein the counting configuration information includes at least one beam identification value.

Clause 43. The apparatus of clause 33 wherein the counting configuration information includes device type information indicating a type of mobile device to send the counting response.

Clause 44. The apparatus of clause 33 wherein the counting response includes identification information associated with a mobile device.

Clause 45. An apparatus for determining a number of mobile devices in a counting area, comprising: means for determining the counting area; means for determining counting configuration information based on the counting area; means for transmitting the counting configuration information to one or more mobile devices; means for receiving counting responses from the one or more mobile devices; and means for determining the number of mobile devices in the counting area based on the counting responses.

Clause 46. An apparatus for transmitting a counting response to a base station, comprising: means for receiving counting configuration information; means for performing one or more signal measurements based on the counting configuration information; and means for transmitting the counting response to the base station based on the one or more signal measurements and the counting configuration information.

Clause 47. A non-transitory processor-readable storage medium comprising processor-readable instructions configured to cause one or more processors to determine a number of mobile devices in a counting area, comprising code for: determining the counting area; determining counting configuration information based on the counting area; transmitting the counting configuration information to one or more mobile devices; receiving counting responses from the one or more mobile devices; and determining the number of mobile devices in the counting area based on the counting responses.

Clause 48. A non-transitory processor-readable storage medium comprising processor-readable instructions configured to cause one or more processors to transmit a counting response to a base station, comprising code for: receiving counting configuration information; performing one or more signal measurements based on the counting configuration information; and transmitting the counting response to the base station based on the one or more signal measurements and the counting configuration information.

The invention claimed is:

1. A method for determining a number of mobile devices in a counting area with at least one network entity, comprising:

receiving, by the at least one network entity, data regarding a counting area;

determining, by the at least one network entity and based on the data, the counting area within a coverage area of at least one base station;

determining, by the at least one network entity, counting configuration information based on the counting area;

transmitting, from the at least one network entity, the counting configuration information to one or more mobile devices;

receiving, at the at least one network entity, counting responses from the one or more mobile devices; and determining, by the at least one network entity, the number of mobile devices in the counting area based on the counting responses.

2. The method of claim 1 wherein the counting configuration information includes at least one of a geographical coordinate and a terrestrial indication information to define the counting area.

3. The method of claim 1 wherein the counting configuration information includes at least one base station identification value.

4. The method of claim 1 wherein the counting configuration information includes at least one beam identification value.

5. The method of claim 1 wherein the counting configuration information includes a beam direction assumptions associated with the counting area.

6. The method of claim 1 wherein the counting configuration information includes quasi-colocation assumptions associated with stations neighboring the counting area.

7. The method of claim 1 wherein the counting configuration information includes one or more reference signal received power values associated with one or more reference signals that are detectable in the counting area.

8. The method of claim 1 wherein the counting configuration information includes device type information indicating a type of mobile devices to send a counting response.

9. The method of claim 1 wherein each of the counting responses includes identification information associated with a mobile device that sent a counting response.

10. A method for transmitting a counting response from a mobile device to a network entity, comprising:

receiving, by the mobile device from the network entity, counting configuration information indicating a counting area, within a coverage area of a base station, and one or more signal measurements to be taken;

performing, by the mobile device, the one or more signal measurements based on the counting configuration information; and transmitting, from the mobile device to the network entity, the counting response to the base station based on the one or more signal measurements and the counting configuration information.

11. The method of claim 10 wherein transmitting the counting response is in response to receiving the counting configuration information.

12. The method of claim 10 wherein transmitting the counting response is based on detecting a triggering condition defined in the counting configuration information.

13. The method of claim 10 wherein the counting configuration information includes at least one of a geographical coordinate and a terrestrial indication information to define a counting area.

14. The method of claim 10 wherein the counting configuration information includes a beam direction assumptions associated with a counting area.

15. The method of claim 10 wherein the counting configuration information includes quasi-colocation assumptions associated with stations neighboring a counting area.

16. The method of claim 10 wherein the counting configuration information includes one or more reference signal received power values associated with one or more reference signals that are detectable in a counting area.

17. The method of claim 10 wherein the counting configuration information includes at least one base station identification value.

18. The method of claim 10 wherein the counting configuration information includes at least one beam identification value.

19. The method of claim 10 wherein the counting configuration information includes device type information indicating a type of mobile device to send the counting response.

20. The method of claim 10 wherein the counting response includes identification information associated with a mobile device.

21. An apparatus, comprising:
a memory;
at least one transceiver;
at least one processor communicatively coupled to the memory and the at least one transceiver, and configured to:
receive, via the at least one transceiver, counting area data regarding a counting area within a coverage area of at least one base station;
determine a counting area within a coverage area of the at least one base station;
determine counting configuration information based on the counting area;
transmit, via the at least one transceiver, the counting configuration information to one or more mobile devices from the at least one base station;
receive, at the at least one base station, counting responses from the one or more mobile devices; and
determine a number of mobile devices in the counting area based on the counting responses.

22. The apparatus of claim 21 wherein the counting configuration information includes at least one base station identification value.

23. The apparatus of claim 21 wherein the counting configuration information includes at least one beam identification value.

24. The apparatus of claim 21 wherein the counting configuration information includes a beam direction assumptions associated with the counting area.

25. The apparatus of claim 21 wherein the counting configuration information includes quasi-colocation assumptions associated with stations neighboring the counting area.

26. An apparatus, comprising:
a memory;
at least one transceiver;
at least one processor communicatively coupled to the memory and the at least one transceiver, and configured to:
receive, via the at least one transceiver, counting configuration information indicating a counting area within a coverage area of a base station and one or more signal measurements to be taken;
perform one or more signal measurements based on the counting configuration information; and
transmit, via the at least one transceiver, a counting response to the base station based on the one or more signal measurements and the counting configuration information.

27. The apparatus of claim 26 wherein the at least one processor is further configured to transmit the counting response is in response to receiving the counting configuration information.

28. The apparatus of claim 26 wherein the at least one processor is further configured to detect triggering condition defined in the counting configuration information and transmit the counting response based on the triggering condition.

29. The apparatus of claim 26 wherein the counting configuration information includes at least one beam identification value.

30. The apparatus of claim 26 wherein the counting configuration information includes device type information indicating a type of mobile device to send the counting response.

* * * * *